April 24, 1951  F. R. MILLER  2,549,838
TOOL FOR SPLICING WIRES
Filed April 3, 1947
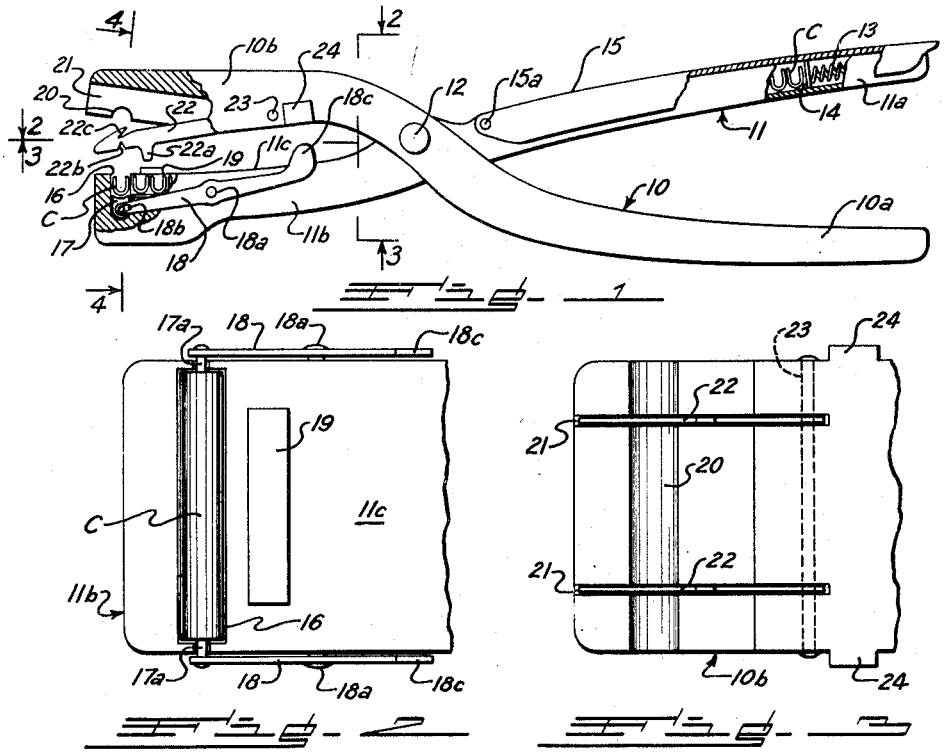
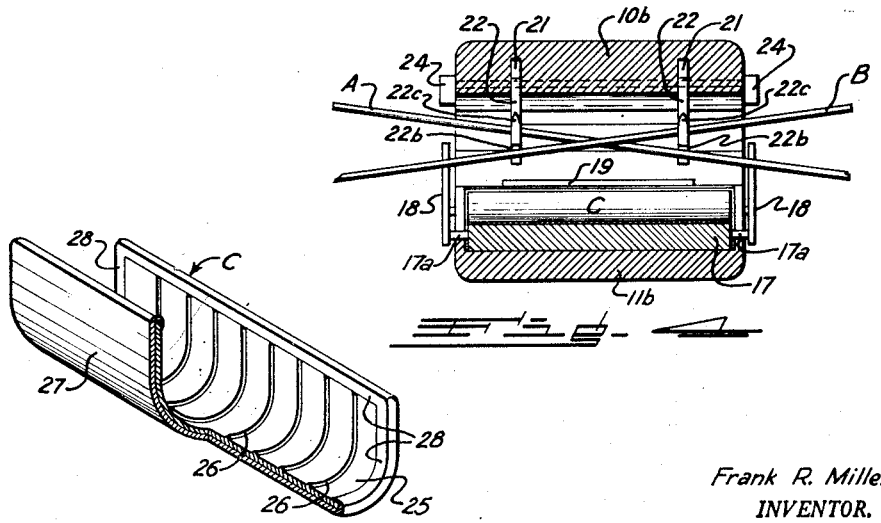
Frank R. Miller
INVENTOR.
BY
ATTORNEY Patented Apr. 24, 1951

2,549,838

UNITED STATES PATENT OFFICE 2,549,838

TOOL FOR SPLICING WIRES

Frank R. Miller, Denver, Colo.

Application April 3, 1947, Serial No. 739,194

2 Claims. (Cl. 7—14.1)

The present invention relates to a tool for splicing wires. It has to do particularly, although not exclusively, with the mechanical, as distinguished from manual, securing together, or splicing, of electrical conducting wires, wherein adjacent or crossed end portions of the wires must be secured together in electrical conducting relationship to complete an electric circuit or circuits.

The splicing of wires, as is well known, constitutes a very important part of the installation, repair, or reorganization of telephone systems. This is particularly true in connection with lead cables having paper or pulp insulation, and the like, wherein it is necessary to secure together, or splice, the ends of innumerable sets of two or more wires. Heretofore, such splicing has involved a hand operation and required the skill of expert splicers whose job it was to make the necessary connections or splices in a system involving a mass of wires. These wires are usually in groups which together are in the form of a cable or multiple-line wires, or a number of them are grouped together in a single conduit. It was necessary for the splicer to skin off the insulation at the end portions of the wires to be secured together, or spliced, and to then twist the end portions together so as to provide a positive and a more or less permanent electrical conducting connection between them. The end portions of the wires thus skinned had to be re-insulated which was usually done by the application thereto of cotton sleeve tubing which had been previously boiled in paraffin and which is three inches long and is used as insulation over the exposed ends of the wires. It is quite obvious that this hand method of securing together, or splicing wires required considerable time and the time required to splice each set of wires together was multiplied by the number of sets of wires to be so interconnected or spliced. In view of the many thousands of such connections or splicings which had to be made, it will be readily appreciated that the time involved in this operation alone was excessive, as was the labor cost.

One of the important objects of the present invention is to provide manually actuated mechanical means for quickly and efficiently, as well as insulatingly, securing together or splicing the end portions of two or more wires to complete a circuit.

Another object of the present invention is to provide an improved portable hand manipulated tool for performing the splicing operation set forth in the preceding paragraph.

A further object of the present invention is to provide an improved wire splicing hand-operated tool which performs in one quick operation, the cutting or severing of the ends of two or more overlapped or crossed wires and the securing together of the end portions of these wires by the application of an externally insulated binder or splicing clip or member.

Another object of the present invention is to provide an improved tool of the foregoing nature with which improved binding or splicing clips or members are used, and one in which the improved clips, contained in a magazine forming a part of, or being associated with, one of the handle members of the tool, are automatically and successively advanced into the proper position to be applied and secured to the wires being connected together; it being a further and important object of the present invention to provide improved means, such as a pliers-like type of tool, for quickly and efficiently mechanically securing together wire ends without the necessity of removing the insulation therefrom.

A further object of the present invention is to provide an improved clip member for use with the aforesaid tool in which the clip, when clamped around the crossed or overlapped ends of the wires, completes the electrical conducting connection between the wires and the clip, without the necessity of having to perform the usual operation of skinning the insulation from the end portions of the wires; it being another object of the present invention to provide an improved clip which, while making a firm electrical conducting connection between the wires, presents an insulated exterior or outside surface which is formed from suitable insulating material.

A further object of the present invention is to provide an improved compound clip structure of the foregoing nature having internal portions which penetrate and pass through the insulation over and covering the end portions of the wire, which are to be spliced and to thus complete the desired electrical conducting connection.

The foregoing and other objects and advantages of the present invention will appear from the following description and appended claims when considered in connection with the accompanying drawings forming a part of this specification wherein like reference characters designate corresponding parts in the several views.

In said drawings:

Fig. 1 is a side elevational view, partly broken away, and partly in section, illustrating one form of wire splicing or connecting tool embodying the present invention.

Fig. 2 is a fragmentary elevational view, on a somewhat enlarged scale, and taken substantially along the line 2—2 of Fig. 1, looking in the direction of the arrows.

Fig. 3 is a fragmentary elevational view, on a somewhat enlarged scale, and taken substantially along the line 3—3 of Fig. 1, looking in the direction of the arrows.

Fig. 4 is a transverse vertical sectional view taken substantially along the line 4—4 of Fig. 1, looking in the direction of the arrows; and Fig. 5 is an enlarged perspective view, partly in section, of one of the improved wire-splicing or connecting clips or elements of the present invention.

Referring now particularly to Figs. 1 to 4, inclusive, of the drawings, there is shown in these figures one form of tool or implement for connecting together or splicing the ends of wires such, for example, as electrical conductors particularly of the type having a covering of insulating material. The end portions of two such wires are indicated at A and B in Fig. 4.

As best seen in Fig. 1, the improved tool of the present invention comprises a pair of crossed handle members, each of which is shown as a whole at 10 and 11. These members are preferably pivotally connected together at 12 and are curved lengthwise, as shown, to provide a pliers-like type of tool. The handles may be of any desired form and cross section but preferably the portions 10a and 11a are substantially U-shaped in cross section, the handle portion 10a having its open side in the direction of the handle portion 11a whose normally open side is in the same direction, namely toward the top of Fig. 1. The U-shaped portion or longitudinal recess or space within the handle member 11a provides, preferably, a magazine or storage space for a plurality of improved wire-connecting or splicing clips, each of which is shown as a whole at C. These clips are preferably located side by side in transverse or crosswise position within the magazine and are urged toward the jaw portion 11b of member 11. A preferably coiled spring 13, or pair of such springs, whose inner end or ends contact a follower or plate member 14, serves to urge the clips forwardly toward the jaw portion or member 11b. As shown, the magazine is provided with a cap or cover 15 which is hingedly mounted at 15a upon the handle portion 11a.

The jaw member 11b is disposed opposite another jaw member 10b formed on the handle 10. The jaws 11b and 10b are disposed at the side of pivot 12 opposite the handle portions 11a and 10a.

The jaw member or portion 11b is provided with a longitudinal groove or passageway which forms a continuation of the magazine which contains the open clips C and is also provided with a transversely extending substantially U-shaped recess or cavity 16 to receive and support a movable anvil or block member 17, see Figs. 1, 2 and 4. The anvil 17 is adapted to be moved or elevated in its groove or recess 16 (which provides a die cavity) by means of a pair of arms or link members 18 pivotally connected at 18a to the side walls of jaw member 11b. These arms or pivoted links 18 are slotted at their outer or forward ends at 18b to loosely receive headed pins 17a carried at opposite ends of anvil 17. The inner or opposite ends of the arms or fingers 18 terminate in enlarged inturned or offset portions 18c. By applying pressure to the portions 18c of the arms, the anvil 17 to which their forward ends are connected may be shifted or elevated in its groove or cavity 16. When one of the clips C is in place upon the anvil 17, as shown in Fig. 1, said clip will also be lifted or elevated out of the groove 16 in the direction of the opposed jaw member 10b. The inner face or surface 11c of jaw 11b carries a raised portion or plate 19 which overlies a portion of the clip-feeding groove or passage from the magazine and extends transversely of the jaw 11b. This portion or member 19 is provided for a purpose to be described below.

It will be understood that the groove 16 and anvil 17 provide, in effect, a die member or cavity for the jaw 11b.

The opposed jaw member 10b is generally similar to the jaw member 11b and is provided with a transversely extending groove, die member, or cavity 20 which is adapted to cooperate with the opposed die member constituted by the groove 16 and anvil 17 of the opposed jaw member 11b. The jaw 10b is also provided with a pair of spaced longitudinally extending slots or grooves 21 which are interrupted by the transversely extending die member or cavity 20, as seen in Figs. 1 and 3.

Each of the grooves or slots 21 provides a space for receiving a knife or wire-severing member 22. These members, as shown, are pivoted adjacent their inner ends upon a removable pin or pintle 23. By removing the pin 23 the cutters or members 22 may be easily removed for repair purposes, or for re-sharpening.

As best seen in Fig. 1, each of the knife members 22 is provided with a depending portion or projection 22a and with a preferably A-shaped notch 22b on one side and with a substantially V-shaped groove and hook-like extension 22c on its upper side. The knife members 22 are preferably made of a thickness so as to have a relatively snug but swinging fit within their slots 21.

The jaw 10b has at its opposite sides projecting portions or ears 24, these being located, as shown, in the vicinity of the pivot pin 23. When the handle members or portions 10a and 11a are grasped and moved toward one another about their connecting pivot 12, the jaw members 10b and 11b are also moved or forced together into cooperating relationship. Such movement causes the projections 22a of the knives to contact the raised portion or plate 19 on the opposite jaw member 11b and to thus move or force the knives 22 about their pivot pin 23 and into their confining grooves or slots 21. While this is taking place, the ears or projections 24 engage the enlarged and offset end portions 18c of the arms 18 and cause the movement or elevation of the anvil 17 and a supported clip C (assuming there is a clip located on the anvil) toward the opposed die member or recess 20.

As seen in Fig. 5, the clips C of the present invention are preferably of composite nature. As shown, each clip comprises a body portion 25 which is substantially U-shaped in cross section and which, as shown, has on its inner surface a series or plurality of internal ribs or projections 26. These ribs 26, as shown, extend transversely or crosswise of the clip member and are preferably arranged in parallelism. The material of the body portion 25 and the ribs 26 is preferably metal which has a relatively high conductivity and which may be deformed so as to permit the clip to be reduced in diameter and brought into gripping engagement with wires to be spliced. The clip C, as shown, is preferably provided with a coating or covering 27 which is formed from some suitable insulating or nonconducting material. This material preferably extends around the side and end edges of the metal body portion 25, as seen at 28, to completely insulate the exterior or outer surfaces of the clip.

Referring now especially to Fig. 4 of the drawings which is a vertical cross section through the jaws of the improved tool or implement and looking into said jaws, it is to be seen that a pair of wires or electrical conductors A and B are positioned in crossed relationship between the open jaws. The end portion of the wire A is shown in engagement with the groove or notch 22b of knife member 22 at the right and with the groove or notch and hook-like portion 22c of the other knife member 22, at the left of Fig. 4. The end portion of the wire B likewise engages the notch 22b of the knife member at the left and also the notch and hook-like member 22c of the other knife member, at the right in this figure. By so engaging the ends of the wires A and B, they will be supported in position between the open jaws and in the vicinity of the die members 16, 17 of jaw 11b and die member or cavity 20 of jaw 10b. It is to be understood that the wires A and B are covered with insulation which is not removed or skinned off prior to the splicing operation.

Assuming the parts are in their positions of Figs. 1 and 4, with one of the improved clips C in position upon the anvil 17, when the handles 10a and 11a are grasped and moved together, the portions 18c of the arms are engaged by the ears 24 and the projections 22a of the knife members 22 contact the raised portion or plate 19. Further movement of the handles toward one another causes movement of the members 18 and the supporting anvil 17 and clip C toward the opposed die member or cavity 20 and also causes movement of the knife or wire-severing members 22 about their common pivot 23 and into their supporting or concealing grooves or slots 21. It will be understood that the cross sectional area or size of the clip C exceeds the space provided, or the area within, the cooperating die members when in closed and forming position. Thus, the first step or phase of the operation is the severing or cutting, by a shearing action of the knife members 22, of the free ends of the wires A and B, the second step being the closing or squeezing together and also the consequent reduction in size transversely of the clip C as it is forced or pressed into the die cavity 20. The end portions of wires A and B being located or positioned between the clip and cavity 20, the closing of the clip about the wire end portions causes the wires to be securely grasped or gripped within the closed clip C.

By virtue of the pressure applied to the clip C by the die members of the jaws during the closing of the clip, the ribs or projections 26 of the clip penetrate and cut through the insulation on the end portions of the wires A and B so as to cause metal to metal contact within the clip and effect a good electrical conducting relationship between the wires and the insulatingly-covered clip member C.

After the application of a clip to a pair of wires, as described above, the jaw members are moved apart to release the attached or spliced wires, whereupon the spring 13 and the follower 14 in the clip magazine will advance another open clip C into position upon the anvil 17, the latter having been returned into the bottom portion of its groove or die cavity 16 by virtue of its own weight. The tool is now in readiness to perform another quick and efficient splicing operation.

From the foregoing it will be seen that the present invention embodies an improved tool which permits the rapid and precise splicing of wires without the previously required steps of first skinning insulation from the wires, then twisting them together, after which it was necessary to insulate the secured-together ends which was done by slipping cotton sleeves over the splice. The only manual operations required to perform a quick and satisfactory splicing operation with the present improved tool are first to position the wire end portions with relation to the cutters or severing members 22 and to grasp and move toward one another, the handle portions 10a and 11a. The splicing of the wires is done mechanically and this effects an extremely noticeable saving in time over previous hand methods.

It will also be seen from the foregoing that there has been provided a new and improved splicing clip or member which may be mechanically applied to the insulated or un-stripped ends of electrical wires or conductors so as to securely splice them together, the clip itself providing the necessary external insulation to completely conceal and insulate the spliced-together ends of the wires.

It is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Having thus described the invention, what is claimed is:

1. In a wire splicing tool including a pair of crossed pivoted handle members having a pair of jaws closable toward one another, a pair of opposed cooperable die members carried by the jaws, an anvil associated with one of said die members, means for moving the anvil toward the other die member when the jaws are brought into closed position, a clip-receiving and storing magazine located in one of said handles and communicating with the die member in which the movable anvil is located, means for moving successive clips into position on said anvil, means for moving said anvil and positioned clip toward and into the opposite die member when the handles are grasped to move the jaws together, and means cooperable with said opposite die member for supporting a pair of crossed wires and for cutting off the free end portions thereof when the die members move together, the movement together of said die members also causing said clip to embrace and bind the wires together in electrical conducting relationship.

2. A wire splicing tool comprising a pair of handle members pivotally connected together, said handle members at one side of the pivotal connection terminating in jaws having opposed die members formed therein, an anvil carried by a jaw and associated with one of said die members, means also carried by said jaw and having a portion engageable by the opposed jaw for moving the anvil toward said opposed die when the two jaws are moved toward one another, means movably connected to and carried by the other of said jaws for supporting the crossed end portions of wires to be spliced disposed within the jaws and between the opposed die members, said wire supporting means having knife-like portions for severing the free ends of the wires when the die members are moved into cooperating relationship upon closing of the jaws, and means for feeding a wire-splicing clip into position upon said anvil to be moved to receive and bind the end portions of the crossed wires together during the wire end-severing operation as the jaws are moved together.

FRANK R. MILLER.

REFERENCES CITED

The following references are of record in the file of this patent:

UNITED STATES PATENTS

| Number | Name | Date |
| --- | --- | --- |
| 385,318 | Norris | June 26, 1888 |
| 397,290 | Hiller | Feb. 5, 1889 |
| 468,293 | Coleman | Feb. 2, 1892 |
| 494,429 | Maney | Mar. 28, 1893 |
| 831,876 | McLeran | Sept. 25, 1906 |
| 1,482,288 | Deuscher | Jan. 29, 1924 |
| 1,627,307 | Bernard | May 3, 1927 |
| 1,836,497 | Phelps | Dec. 5, 1931 |
| 1,959,888 | Wilkins | May 22, 1934 |
| 2,055,257 | Maynard | Sept. 22, 1936 |
| 2,062,098 | MacChesney | Nov. 24, 1936 |
| 2,369,180 | Rosenthal | Feb. 13, 1945 |